United States Patent [19]

Deal et al.

[11] Patent Number: 4,965,096
[45] Date of Patent: Oct. 23, 1990

[54] METHOD FOR PREPARING IMPROVED LITHIUM-SILICATE GLARE-REDUCING COATING FOR A CATHODE-RAY TUBE

[75] Inventors: Samuel B. Deal, Manheim Township, Lancaster County; Donald W. Bartch, Hellam Township, York County, both of Pa.

[73] Assignee: RCA Licensing Corp., Princeton, N.J.

[21] Appl. No.: 236,403

[22] Filed: Aug. 25, 1988

[51] Int. Cl.⁵ .................. H01J 31/00; B05D 5/02
[52] U.S. Cl. .................... 427/165; 427/64; 427/168; 427/110; 427/314; 427/353; 427/354; 427/380; 427/226; 313/479; 428/428
[58] Field of Search ............ 427/165, 164, 64, 314, 427/168, 110, 353, 354, 380, 226; 313/479, 478; 428/428

[56] References Cited

U.S. PATENT DOCUMENTS

| | | | |
|---|---|---|---|
| 3,114,668 | 12/1963 | Guiles | 161/116 |
| 3,635,751 | 1/1972 | Long, III et al. | 117/94 |
| 3,689,312 | 9/1972 | Long, III et al. | 117/94 |
| 3,898,509 | 8/1975 | Brown, Jr. et al. | 313/478 |
| 3,940,511 | 2/1976 | Deal et al. | 427/165 |
| 4,560,581 | 12/1985 | Deal et al. | 427/64 |
| 4,563,612 | 1/1986 | Deal et al. | 313/478 |

FOREIGN PATENT DOCUMENTS 51-13487  4/1976  Japan.

Primary Examiner—Norman Morgenstern
Assistant Examiner—Roy V. King
Attorney, Agent, or Firm—Joseph S. Tripoli; Dennis H. Irlbeck; Vincent J. Coughlin, Jr.

[57] ABSTRACT

An antistatic, glare-reducing coating, as for the surface of the viewing surface of a CRT is prepared by (a) warming a glass support surface above room temperature, (b) coating a surface of the warm support with an aqueous solution containing a lithium-stabilized silica sol and an inorganic metallic compound, and drying the deposited coating, (c) heating the glass support surface and the coating to a temperature of about 65° C. for about 30 seconds, and (d) washing and then drying the coating.

5 Claims, 1 Drawing Sheet

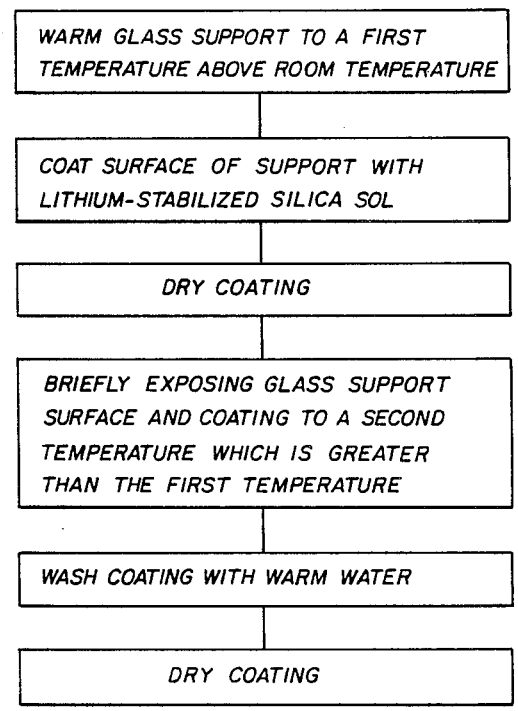

```
┌─────────────────────────────────────────┐
│ WARM GLASS SUPPORT TO A FIRST           │
│ TEMPERATURE ABOVE ROOM TEMPERATURE      │
└─────────────────────────────────────────┘
                    │
┌─────────────────────────────────────────┐
│ COAT SURFACE OF SUPPORT WITH            │
│ LITHIUM-STABILIZED SILICA SOL           │
└─────────────────────────────────────────┘
                    │
┌─────────────────────────────────────────┐
│             DRY COATING                 │
└─────────────────────────────────────────┘
                    │
┌─────────────────────────────────────────┐
│ BRIEFLY EXPOSING GLASS SUPPORT          │
│ SURFACE AND COATING TO A SECOND         │
│ TEMPERATURE WHICH IS GREATER            │
│ THAN THE FIRST TEMPERATURE              │
└─────────────────────────────────────────┘
                    │
┌─────────────────────────────────────────┐
│ WASH COATING WITH WARM WATER            │
└─────────────────────────────────────────┘
                    │
┌─────────────────────────────────────────┐
│             DRY COATING                 │
└─────────────────────────────────────────┘
```

METHOD FOR PREPARING IMPROVED LITHIUM-SILICATE GLARE-REDUCING COATING FOR A CATHODE-RAY TUBE

BACKGROUND OF THE INVENTION

This invention relates to an improved method for preparing a glare-reducing image transmitting lithium-silicate coating on a glass support, such as a viewing surface of a cathode-ray tube, CRT. The coating also may be formulated to provide antistatic characteristics.

S. B. Deal et al. U.S. Pat. No. 4,560,581, issued on Dec., 24, 1985, describes a method for preparing a lithium-silicate, glare reducing coating on a glass support. In that prior method, the glass support is warmed, to about 40° to 80° C., and then coated, e.g., by air spraying, with a dilute aqueous solution containing a lithium-stabilized silica sol. The coating is air dried, washed with warm water, air dried a second time, and then baked at a temperature below 100° C., and preferably at about 90° C., for 10 to 60 minutes. The abrasion resistance is directly related to the baking temperature. The higher the baking temperature the higher will be the abrasion resistance of the coating. The process differs from the processes disclosed previously in M. G. Brown, Jr. et al., U.S. Pat. No. 3,898,509, issued on Aug. 5, 1975, and S. B. Deal et al., U.S. Pat. No. 3,940,511, issued on Feb. 24, 1976, in that the methods disclosed in the latter mentioned patents require that the coating be baked dry at temperatures above 150° C., before washing. The patentees believed the pre-wash high temperature bake was required to reduce the solubility of the coating in water, to increase its adherence to the glass support, and to increase its resistance to abrasion to practical values.

S. B. Deal et al., U.S. Pat. No. 4,563,612, issued on Jan. 7, 1986, discloses a cathode-ray tube having, on its external viewing surface, an antistatic, glare-reducing image-transmitting coating. The coating composition includes, in addition to an aqueous lithium-stabilized silica sol, an inorganic metallic compound which imparts an antistatic characteristic to the coating. The coating is applied, e.g., by air spraying, to the tube faceplate which has been warmed to about 40° to 45° C., for about 30 minutes. The coating is dried and then baked at between 150° and 300° C. for 10 to 60 minutes; although, a 10 minute bake at a temperature of 120° C. (with a 30 minute warm-up and 30 minute cool-down) has also been successfully utilized. The baking develops the final electrical, optical and physical properties of the antistatic, glare-reducing coating. The coating is disclosed to be inexpensive, easy to make, and more resistant to abrasion and to ordinary factory heat-treating operations than the structurally different quarter-wave glare-reducing coatings of the prior art which are said to have an antistatic characteristic.

A drawback of the antistatic, glare-reducing coating described in U.S. Pat. No. 4,563,612 is that a time consuming, costly baking step, at temperatures of at least 120° C. and preferably in the range of 150° to 300° C., is used in order to develop the final electrical, optical and physical properties of the coating.

SUMMARY OF THE INVENTION

The novel method comprises warming a glass support to a first temperature above room temperature, preferably to about 48° to 50° C., and coating, as by spraying, a surface of the warm support with an aqueous solution containing a lithium-stabilized silica sol, and then briefly exposing the surface of the support and the coating thereon to a heat source, to raise the temperature thereof to a second temperature greater than the first temperature. The coating is then washed in warm water to remove soluble alkali compounds, as in the prior art. As is known in the art, an inorganic metallic compound, such as a palladium compound, may be added to the coating composition to provide an antistatic characteristic.

Surprisingly, the brief exposure of the surface of the support and the coating thereon to a heat source which raises the surface and the coating to a second temperature (e.g., about 65° C.), greater than the first temperature, is satisfactory for developing the optical and physical characteristics of the coating. It has been determined that when the coating contains small concentrations of the palladium compound, the antistatic property of the resultant coating is equivalent to the coating made by the method of U.S. Pat. No. 4,563,612, but the present coating can be made at a reduction in process time and cost.

BRIEF DESCRIPTION OF THE DRAWING

The sole FIGURE is a flow chart diagram of the novel method.

DETAILED DESCRIPTION OF THE PREFERRED EMBODIMENTS

The novel method may be practiced as described in the above cited Deal et al. U.S. Pat. No. 4,563,612 except for the sequence of steps, the method of heating, some of the temperature ranges and the preferred operating temperatures. A principal change from the prior method is that, subsequent to coating the viewing surface of the CRT with the antistatic, glare-reducing coating, a heat source is utilized to rapidly heat the coating and its underlying surface, in about 30 seconds to a temperature of about 65° C., to develop the antistatic, optical and physical characteristics of the coating at a substantial reduction in heating time and cost. The coating is subsequently washed in warm (49° e.g., to 60° C.) water and dried. No final high temperature baking step is required to obtain a coating that has excellent abrasion and fingerprint resistance. Additionally, defective coatings can be easily removed for at least a week after processing.

The novel method is schematically illustrated in the flow-chart diagram of the sole FIGURE. Prior to starting the novel method, a glass surface which is to carry the glare-reducing coating is carefully cleaned. The surface may be the outer surface of the faceplate of a cathode-ray tube, or the convex surface of a glass safety panel which is to be laminated to the faceplate of a cathode-ray tube, or the surface of any other glass support which is to be a viewing surface, such as the glass pane for a framed picture. The surface may be cleaned by any of the known scouring and washing methods used to remove dirt, lint, oil, scum, etc., that will not scratch the surface. It is preferred to scrub the surface with a commercial scouring compound, then to rinse with deionized water, then to swab with a 5% ammonium bifluoride solution, then again to rinse with deionized water, then to drain and dry the surface in air.

By the preferred process, a clean glass support, such as the faceplate of an evacuated and sealed tube, is warmed to about 50° C., as in an oven. The external surface of the warm faceplate and the tensioned metal band around the faceplate are coated with a dilute aqueous solution of a lithium-stabilized silica sol and a water-soluble metallic compound, such as palladium sulfate, tin sulfate, tin chloride or gold chloride. The coating may be applied in one or several layers by any conventional process, such as by spraying. The temperature of the faceplate, the specific technique for applying the coating and the number of layers applied are chosen empirically to produce a coating with the desired thickness. The temperature of the faceplate is preferably about 48° to 50° C. Temperatures that are too low (e.g., 20° C.) cause the coating to bead, or to have too high a specular reflectance, while temperatures that are too high produce coatings which give a dry appearance. It has been found that, when applying the coating by spraying, the dry coating thickness should be such as to permit the operator to resolve the three bulbs of the reflection of a three-bulb fluorescent light fixture located about 6 feet (about 1.83 meters) above the glass support. A thicker initial coating results in a thicker final coating. Generally, the thicker the coating, the greater the reduction in glare and the greater the loss in resolution of the luminescent image. Conversely, the thinner the coating, the lesser the reduction in glare and the lesser the loss in resolution of the luminescent image.

Also, when applied by spraying, the coating takes on an appearance of dryness. Greater dryness is achieved by (1) using higher panel temperatures while applying the coating, (2) using more air in the spray when spraying with compressed air, (3) using a greater spraying distance when spraying on the coating, and (4) increasing the mole ration of $SiO_2/Li_2O$. But, when this is overdone, the coating crazes. The greater the appearance of dryness, the greater the glare reduction and the greater the loss in resolution of the luminescent image. Conversely, the lesser the appearance of dryness, the lesser the glare reduction and the lesser the loss in resolution of the luminescent image.

The coating composition is preferably an aqueous lithium-stabilized silica sol containing about 1 to 10 weight percent solids and 0.005 to 0.02 weight percent metallic element of the metallic compound with respect to the weight of the total solids in the sol. The metallic element may be one or more of platinum, palladium, tin and gold and is preferably introduced into the sol as a water-soluble salt. Generally, any of the metallic elements that are used to sensitize surfaces for electroless plating may be used as one or more of the metallic elements in the novel tube. When the concentration of the metallic element is below about 0.005 weight percent, the antistatic characteristic may be insufficient or may be erratic. When the concentration of the metallic element is above about 0.02 weight percent, the coating may be mottled, iridescent or otherwise adversely affected in transmission. In the sol, the ratio of $SiO_2$ to $Li_2O$ is from about 4:1 to about 25:1. The sol is substantially free of alkali metal ions other than lithium and is substantially free of anions other than hydroxyl. The lithium-stabilized silica sol differs substantially from a lithium silicate solution, which is a compound dissolved in a solvent and not a sol. Upon subsequent heating, a lithium-sol coating dries to form a lithium-silicate coating. A solution of a silicate of one or more of lithium, sodium and potassium may substitute for the lithium-stabilized sol. Also, an organic silicate such as tetraethyl orthosilicate may substitute for the preferred lithium-stabilized silica sol. The formulation may also contain pigment particles and/or dyes to reduce the brightness up to about 50 percent of its initial value and/or to modify the spectral distribution of the transmitted image.

After coating the warm glass support, the coating is dried in air, with care, to avoid the deposition of lint or other foreign particles on the coating. The coating and its underlying support surface are exposed or "skin" heated for about 30 seconds to the heat generated by either a conventional infrared (IR) heat source or a Calrod heater. Calrod heaters are manufactured by GE, Schenectady, N.Y. The temperature of the support surface is about 65° C. as measured, e.g., by a thermocouple attached to the faceplate. Alternatively, the support surface temperature can be measured using an infrared (IR) thermometer. The "skin" heating does not substantially heat the body of the faceplate. Generally, the higher the heating temperature, the lower will be the glare reduction in the product and the higher will be the abrasion resistance. In the prior art, it was believed that baking temperatures within the range of 150° to 300° C. for 10 to 60 minutes were required to achieve sufficient abrasion resistance. The present method establishes that high baking temperatures sustained for up to an hour are unnecessary to obtain high quality antistatic, glare-reducing coatings if the coatings is "skin" heated and subsequently washed to remove soluble alkali compounds.

The coating is washed with warm deionized water having a temperature of about 49° to 60° C. The water is preferably applied as a limp stream for about 5 seconds. The tube may be recycled or salvaged by sponge washing a defective coating with a 5% ammonium bifluoride solution up to at least a week after manufacturing.

The product of the novel method is an antistatic, glare-reducing coating on the viewing surface of a glass support such as the exterior surface of a CRT. The coating has the quality of glare reduction, that is, scattering of reflected light, and, at the same time, transmission of the luminescent image on the phosphor screen of the tube with a resolution of at least 500 lines per inch (about 197 lines per cm.) The coating is chemically stable to manufacturing processes and to subsequent exposure to humid atmospheres. The coating resists abrasion and fingerprints and exhibits a substantially flat spectral response to both reflected and transmitted light.

The product of the novel method is superior to that of prior methods in that it has (1) lower specular reflectance with equivalent image resolution; (2) a much smaller lowering of the TMTF (transmission modulation transfer function) at high frequencies, where edge transitions in display characters are dependent; and (3) negligible milkiness of the coating at the viewing surface.

EXAMPLE

The faceplate surface of a 13-inch (about 33-cm.) rectangular color display tube that is exhausted, sealed and cleaned to remove dirt, oil, scum, etc., by any of the known scouring and washing procedures. Then the surface is washed for 5 seconds with a 5 weight-percent ammonium bifluoride solution and rinsed with deionized water for 10 seconds at a temperature of 49° to 60° C. The faceplate surface is dried at 65° C., with a hot air knife. The tube is transferred to an oven and preheated to 50° C. for about 5 to 10 minutes or until the temperature of the tube faceplate surface is about 48° to 50° C. Alternatively, the surface can be heated with IR for 2 to 3 minutes. A liquid coating composition is sprayed onto the warm faceplate surface. The coating composition is prepared by mixing 8.09 l. Lithium Silicate 48 (a lithium-stabilized silica sol containing 22.1% solids, 1.17 sp. gr.) marketed by E. I. DuPont Company, Wilmington, Del, 0.254 l. Palladium D.N.S. solution (4.0 grams of palladium/100 ml. of solution) marketed by Johnson Matthey Inc., Malvern, Pa, and 86.289 l. of deionized water. This provides a 94.633 l. (25 gal.) batch of coating solution. The silica sol has a mole ratio of $SiO_2$ to $Li_2O$ of about 4.8. The spray is applied in 18 frames (4-4-4-6), with four passes per frame, for a 13-inch (about 33 cm.) tube. An 8 to 10 inch (about 20.3 to 25.4 cm.) spacing is provided between the spray gun nozzle and the faceplate of the tube. The tube is rotated 90° after each set of four frames. Because of the heat of the faceplate, the coating material dries within about 10 seconds after each pass. The dried tube faceplate is exposed to either an IR heater or a Calrod heater for 30 seconds, to "skin" heat the surface of the faceplate and the coating to about 65° C. The coating is then washed for about five seconds with a limp stream of deionized water having a temperature of about 49° to 60° C. The faceplate and coating are dried at 65° C. with a hot air knife.

The composition described herein, but without the palladium compound, can also be used as a glare-reducing coating; however, the coating will not have an antistatic characteristic.

What is claimed is:

1. A method for preparing an optical viewing screen having a glare-reducing viewing surface comprising
   (a) warming a glass support to a temperature of about 50° C.,
   (b) coating a surface of said warm support with an aqueous solution containing lithium-stabilized silica sol, and drying the deposited coating,
   (c) exposing said surface of said support and said deposited coating to a heat source for about 30 seconds to raise said surface and said deposited coating to a temperature of about 65° C.,
   (d) washing said dry coating with water, and
   (e) drying said coating.

2. A method for preparing an optical viewing screen having an antistatic, glare-reducing viewing surface for a cathode-ray tube comprising
   (a) warming a glass faceplate to a temperature of about 50° C.,
   (b) coating an exterior surface of said warm faceplate with an aqueous solution containing lithium-stabilized silica sol and an inorganic metallic compound selected from the group consisting of palladium sulfate, tin sulfate, tin chloride and gold chloride present in a concentration within the range of 0.005 to 0.02 weight percent for imparting antistatic characteristics to said coating, and drying the deposited coating,
   (c) reheating the exterior surface of said faceplate and said deposited coating to a temperature of about 65° C. for 30 seconds without substantially heating the body of said faceplate,
   (d) washing said dry coating with water, and
   (e) drying said coating.

3. The method defined in claim 1 wherein, at step (a), said glass support is heated to temperatures of about 48° to 50° C.

4. The method defined in claim 2 wherein, at step (a), said glass faceplate is heated to temperatures of about 48° to 50° C.

5. A method for preparing an optical viewing screen having an antistatic, glare-reducing viewing surface for a cathode-ray tube comprising
   (a) warming a glass faceplate of said tube to about 48° to 50° C.,
   (b) coating an exterior surface of said warm faceplate with an aqueous solution containing lithium-stabilized silica sol and a palladium compound in a concentration within the range of 0.005 to 0.02 weight percent for imparting an antistatic characteristic to said coating, and drying the deposited coating,
   (c) reheating the exterior surface of said faceplate for about 30 seconds to a temperature of about 65° C. without substantially heating the body of the faceplate,
   (d) washing said dry coating with water, and
   (e) drying said coating.

* * * * *